(12) United States Patent
Piparsaniya

(10) Patent No.: US 11,956,577 B2
(45) Date of Patent: Apr. 9, 2024

(54) MANAGING DATA TRANSMISSION FROM A PLURALITY OF TELEMETRY DEVICES ONBOARD TRAINS

(71) Applicant: Siemens Mobility, Inc., New York, NY (US)

(72) Inventor: Harsh Piparsaniya, Pune (IN)

(73) Assignee: Siemens Mobility, Inc., New York, NY (US)

( * ) Notice: Subject to any disclaimer, the term of this patent is extended or adjusted under 35 U.S.C. 154(b) by 0 days.

(21) Appl. No.: 17/823,272

(22) Filed: Aug. 30, 2022

(65) Prior Publication Data
US 2024/0073565 A1 Feb. 29, 2024

(51) Int. Cl.
*H04Q 9/00* (2006.01)
(52) U.S. Cl.
CPC .................... *H04Q 9/00* (2013.01)
(58) Field of Classification Search
CPC .. H04Q 9/00; H04Q 2209/00; H04Q 2209/10; H04Q 2209/20; H04Q 2209/25; H04Q 2209/40; H04Q 2209/43; H04Q 2209/80; H04Q 2209/826; H04Q 2209/84; H04Q 2209/86; B61L 3/002; B61L 15/00; B61L 15/0018; B61L 15/0027; B61L 15/0054; B61L 15/0072; B61L 15/0081; B61L 25/00; B61L 25/02; B61L 25/04
See application file for complete search history.

(56) References Cited

U.S. PATENT DOCUMENTS

| 6,505,104 | B2 * | 1/2003 | Collins | B61L 27/40 |
| | | | | 701/19 |
| 7,461,130 | B1 * | 12/2008 | AbdelAziz | H04W 84/20 |
| | | | | 709/208 |
| 11,584,411 | B2 * | 2/2023 | Gebert | H04L 5/0055 |

* cited by examiner

*Primary Examiner* — Franklin D Balseca
(74) *Attorney, Agent, or Firm* — Schmeiser, Olsen & Watts, LLP

(57) ABSTRACT

The present disclosure relates to managing data transmission from a plurality of telemetry devices onboard one or more trains. The plurality of telemetry devices comprises a first telemetry device and one or more second telemetry devices in a vicinity of the first telemetry device at an instant of time. The first telemetry device is configured to detect presence of the one or more second telemetry devices, and to initiate a negotiation process for identifying a designated telemetry device from the one or more second telemetry devices. During the negotiation process, status data associated with the telemetry devices are aggregated. The aggregated status data is further processed to identify a designated telemetry device from among the telemetry devices. The designated telemetry device performs actions for managing data transmission from the telemetry devices based on the aggregated status data.

20 Claims, 6 Drawing Sheets

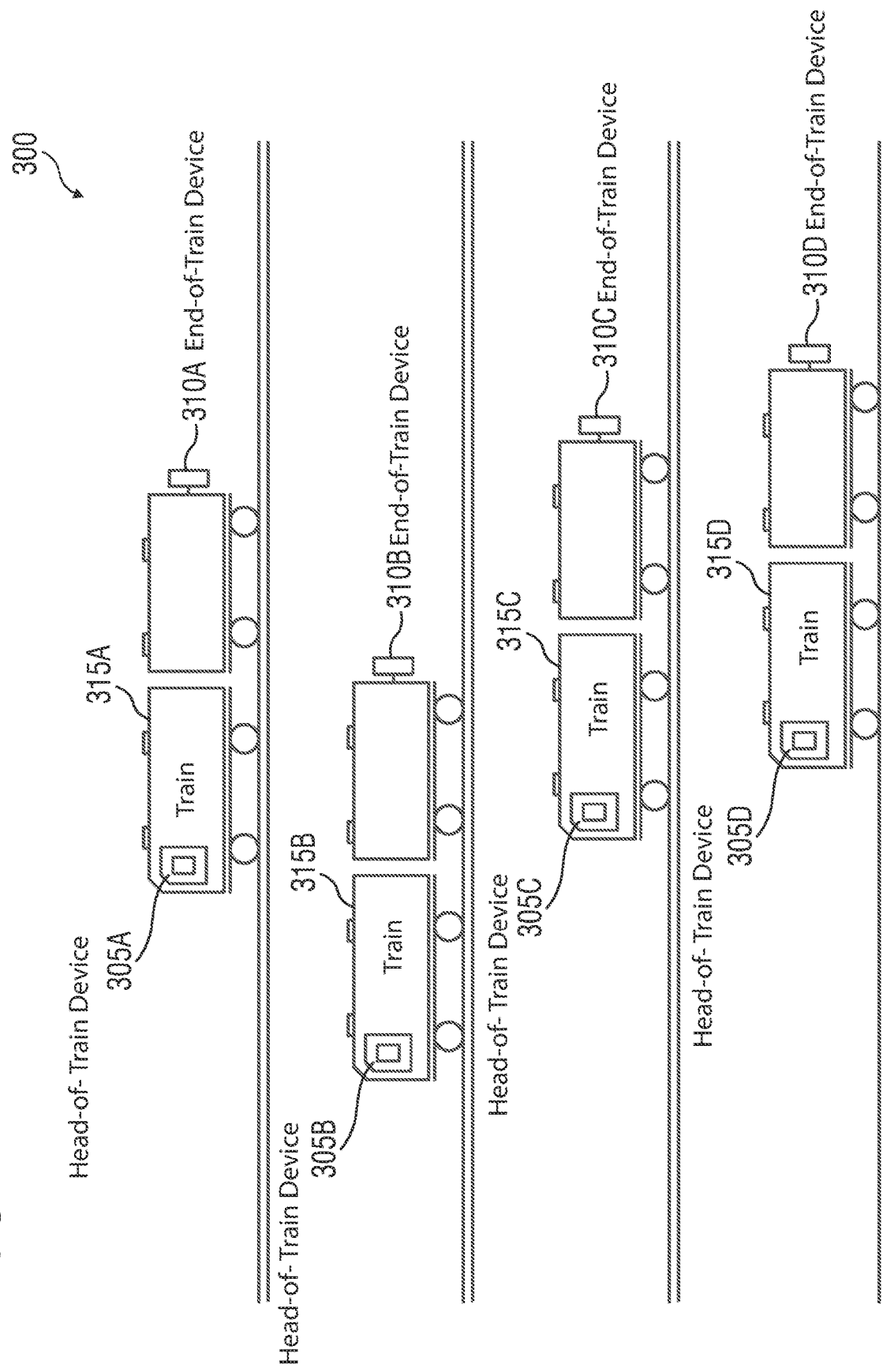

FIG 4

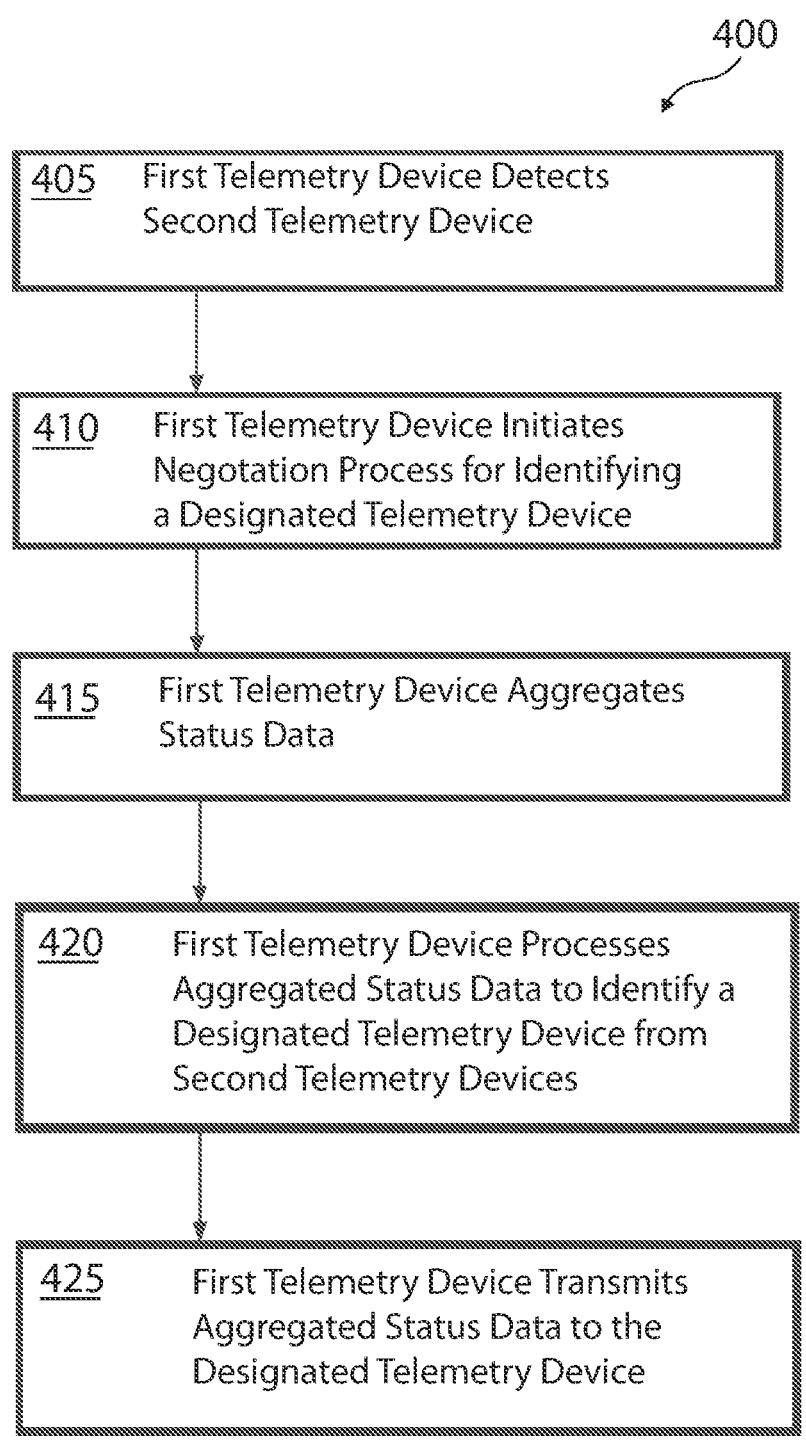

- 405 First Telemetry Device Detects Second Telemetry Device
- 410 First Telemetry Device Initiates Negotation Process for Identifying a Designated Telemetry Device
- 415 First Telemetry Device Aggregates Status Data
- 420 First Telemetry Device Processes Aggregated Status Data to Identify a Designated Telemetry Device from Second Telemetry Devices
- 425 First Telemetry Device Transmits Aggregated Status Data to the Designated Telemetry Device

400

MANAGING DATA TRANSMISSION FROM A PLURALITY OF TELEMETRY DEVICES ONBOARD TRAINS

FIELD OF INVENTION

The present disclosure relates to telemetry systems on trains, and more particularly relates to managing data transmission from a plurality of telemetry devices on trains.

BACKGROUND

An End-of-Train Telemetry system comprises a Head-of-Train device mounted inside a driver's cab of a train and an End-of-Train device mounted at the rear end of the train. The Head-of-Train device is configured to communicate with the End-of-Train device through Radio-Frequency communication. Both the End-of-Train device and the Head-of-Train device may be hereinafter referred to as telemetry devices.

During a trip, the train may halt or wait in yards, for example, to offload and/or onload freight containers. When multiple trains are present in a yard, each of the trains contain its own telemetry devices. As part of various regional regulations, each of the telemetry devices on the trains may be required to send status and position data to other apparatus at different intervals of time. For example, the apparatus may include a cloud server, a wayside system, an onboard subsystem on the same train or a different train etc. Consequently, each of the telemetry devices consume bandwidth on the network. As a result, data costs are incurred for each of the telemetry devices. In addition, multiple telemetry devices communicating at the same time increases data traffic, and may lead to data packet corruption, data packet drop etc. Furthermore, transmission of data also results in draining of battery associated with the telemetry devices. Although the battery is continuously getting charged, constant draining of the battery may lead to overall degradation of battery life in the long run.

In light of the above, there is a need for a mechanism to effectively manage data transmission from a plurality of telemetry devices installed onboard trains.

SUMMARY

In an aspect of the present invention, a first telemetry device configured to detect presence of one or more second telemetry devices is disclosed. The first telemetry device is further configured to initiate a negotiation process for identifying a designated telemetry device from the one or more second telemetry devices by broadcasting a negotiation start message over a second communication frequency. The first telemetry device is further configured to aggregate status data associated with the first telemetry device, and status data received over the second communication frequency from the one or more second telemetry devices in response to the negotiation start message. The first telemetry device is further configured to process the aggregated status data to identify a designated telemetry device from among the first telemetry device and the one or more second telemetry devices. The first telemetry device is further configured to transmit the aggregated status data to the designated telemetry device over the second communication frequency, if the designated telemetry device is not the first telemetry device, to enable the designated telemetry device to perform one or more actions for managing data transmission from the plurality of telemetry devices.

In another aspect of the present invention, a plurality of telemetry devices mounted on one or more trains, wherein each of the telemetry devices is configured to periodically transmit status data to one or more apparatuses over a first communication frequency. In an embodiment, the status data comprises one or more health parameters associated with the respective telemetry device. The plurality of telemetry devices comprises a first telemetry device and one or more second telemetry devices in a vicinity of the first telemetry device at an instant of time.

The first telemetry device is configured to detect presence of the one or more second telemetry devices. In an embodiment, the first telemetry is configured to detect presence of the one or more second telemetry devices by listening to modulated signals in the first communication frequency, demodulating each of the modulated signals based on a predetermined demodulation technique to generate a modulating signal, and processing the modulating signal to identify a device attribute, wherein the device attribute corresponds to the second telemetry device that transmitted the modulated signal.

The first telemetry device is further configured to initiate a negotiation process for identifying a designated telemetry device from the one or more second telemetry devices by broadcasting a negotiation start message over a second communication frequency. The first telemetry device is further configured to aggregate status data associated with the first telemetry device, and status data received over the second communication frequency from the one or more second telemetry devices in response to the negotiation start message. The first telemetry device is further configured to process the aggregated status data to identify a designated telemetry device from among the first telemetry device and the one or more second telemetry devices.

In an embodiment, the first telemetry device is configured to process the aggregated status data to identify a designated telemetry device from among the first telemetry device and the one or more second telemetry devices, by determining at least one best-suited health parameter from among the health parameters associated with the first telemetry device and the one or more second telemetry devices, using a negotiation algorithm, and identifying a device attribute corresponding to the at least one best-suited health parameter, wherein the identified device attribute is indicative of the designated telemetry device.

The first telemetry device is further configured to transmit the aggregated status data to the designated telemetry device over the second communication frequency, if the designated telemetry device is not the first telemetry device, to enable the designated telemetry device to perform one or more actions for managing data transmission from the plurality of telemetry devices.

In an embodiment, the designated telemetry device is configured to transmit the aggregated status data received from the first telemetry device to the one or more apparatuses over the first communication frequency. In another embodiment, the designated telemetry device is configured to determine configuration data for each of the first telemetry device and the one or more second telemetry devices, using a predefined function, and transmit the respective configuration data to each of the first telemetry device and the one or more second telemetry devices other than the designated telemetry device, over the second communication frequency, wherein each of the first telemetry device and the one or more second telemetry devices are configured, based on the configuration data received from the designated telemetry device, to transmit respective status data to the one or more apparatuses.

In another embodiment, the designated telemetry device is configured to obtain status data from one or more third telemetry devices undetected by the first telemetry device over the second communication frequency, and update the aggregated status data received from the first telemetry device with the status data obtained from the one or more third telemetry devices. In an embodiment, the designated telemetry device is further configured to transmit the updated aggregated status data to the one or more apparatuses over the first communication frequency. In an alternate embodiment, the designated telemetry device is configured to determine configuration data for each of the first telemetry device, the one or more second telemetry devices and the one or more third telemetry devices using a predefined function, and transmit the respective configuration data to each of the first telemetry device, the one or more second telemetry devices and the one or more third telemetry devices other than the designated telemetry device, over the second communication frequency, wherein each of the first telemetry device, the one or more second telemetry devices and the one or more third telemetry devices is configured, based on the configuration data received from the designated telemetry device, to transmit respective status data to the one or more apparatuses.

In another aspect, a method for managing data transmission from a plurality of telemetry devices mounted on one or more trains is disclosed. Each of the telemetry devices is configured to periodically transmit status data to one or more apparatuses over a first communication frequency. In an embodiment, the status data comprises one or more health parameters associated with the respective telemetry device. In a further embodiment, the one or more health parameters comprise at least one of cell modem health, cell modem signal strength, device health and radio health, received signal strength and transmission power. The plurality of telemetry devices comprises a first telemetry device, and one or more second telemetry devices in a vicinity of the first telemetry device at an instant of time.

The method comprises detecting, by a first telemetry device, presence of the one or more second telemetry devices. In an embodiment, detecting, by the first telemetry device, presence of the one or more second telemetry devices comprises listening to modulated signals in the first communication frequency, demodulating each of the modulated signals based on a predetermined demodulation technique to generate a modulating signal, and processing the modulating signal to identify a device attribute, wherein the device attribute corresponds to the second telemetry device that transmitted the modulated signal.

The method further comprises initiating, by the first telemetry device, a negotiation process for identifying a designated telemetry device from the one or more second telemetry devices by broadcasting a negotiation start message over a second communication frequency. The method further comprises aggregating, by the first telemetry device, status data associated with the first telemetry device, and status data received over the second communication frequency from the one or more second telemetry devices in response to the negotiation start message. The method further comprises processing, by the first telemetry device, the aggregated status data to identify a designated telemetry device from among the first telemetry device and the one or more second telemetry devices.

In an embodiment, processing, by the first telemetry device, the aggregated status data to identify a designated telemetry device from among the first telemetry device and the one or more second telemetry devices, comprises determining at least one best-suited health parameter from among the health parameters associated with the first telemetry device and the one or more second telemetry devices, using a negotiation algorithm, and identifying a device attribute corresponding to the at least one best-suited health parameter, wherein the identified device attribute is indicative of the designated telemetry device.

The method further comprises transmitting, by the first telemetry device, the aggregated status data to the designated telemetry device over the second communication frequency, if the designated telemetry device is not the first telemetry device, to enable the designated telemetry device to perform one or more actions for managing data transmission from the plurality of telemetry devices. In an embodiment, the method further comprises transmitting, by the designated telemetry device, the aggregated status data received from the first telemetry device to the one or more apparatuses over the first communication frequency.

In another embodiment, the method further comprises computing, by the designated telemetry device, at least one configuration data to be assigned to each of the first telemetry device and the one or more second telemetry devices using a predefined function. Further, the designated telemetry device transmits the respective configuration data to each of the first telemetry device and the one or more second telemetry devices other than the designated telemetry device, over the second communication frequency, wherein each of the first telemetry device and the one or more second telemetry devices is configured, based on the configuration data received from the designated telemetry device, to transmit respective status data to the one or more apparatuses.

In another embodiment, the method further comprises obtaining, by the designated telemetry device, status data from one or more third telemetry devices undetected by the first telemetry device over the second communication frequency. Further, the designated telemetry device updates the aggregated status data received from the first telemetry device with the status data obtained from the one or more third telemetry devices. In a further embodiment, the updated aggregated status data is transmitted to the one or more apparatus, by the designated telemetry device, over the first communication frequency. In an alternate further embodiment, the method comprises determining, by the designated telemetry device, configuration data for each of the first telemetry device, the one or more second telemetry devices and the one or more third telemetry devices using a predefined function. Further, the respective configuration data is transmitted by the designated telemetry device, to each of the first telemetry device, the one or more second telemetry devices other than the designated telemetry device and the one or more third telemetry devices, over the second communication frequency, wherein each of the first telemetry device, the one or more second telemetry devices and the one or more third telemetry devices is configured, based on the configuration data received from the designated telemetry device, to transmit respective status data to one or more apparatuses.

BRIEF DESCRIPTION OF FIGURES

The above-mentioned attributes, features, and advantages of this invention and the manner of achieving them, will become more apparent and understandable (clear) with the following description of embodiments of the invention in conjunction with the corresponding drawings. The illustrated embodiments are intended to illustrate, but not limit the invention.

The present invention is further described hereinafter with reference to illustrated embodiments shown in the accompanying drawings, in which:

FIG. 3A illustrates a plurality of trains standing adjacent to each other on parallel tracks in a yard;

FIG. 4 shows a flowchart of a method for managing data transmission from a plurality of telemetry devices mounted on one or more trains, in accordance with an embodiment of the present invention.

DETAILED DESCRIPTION

Figure 1:
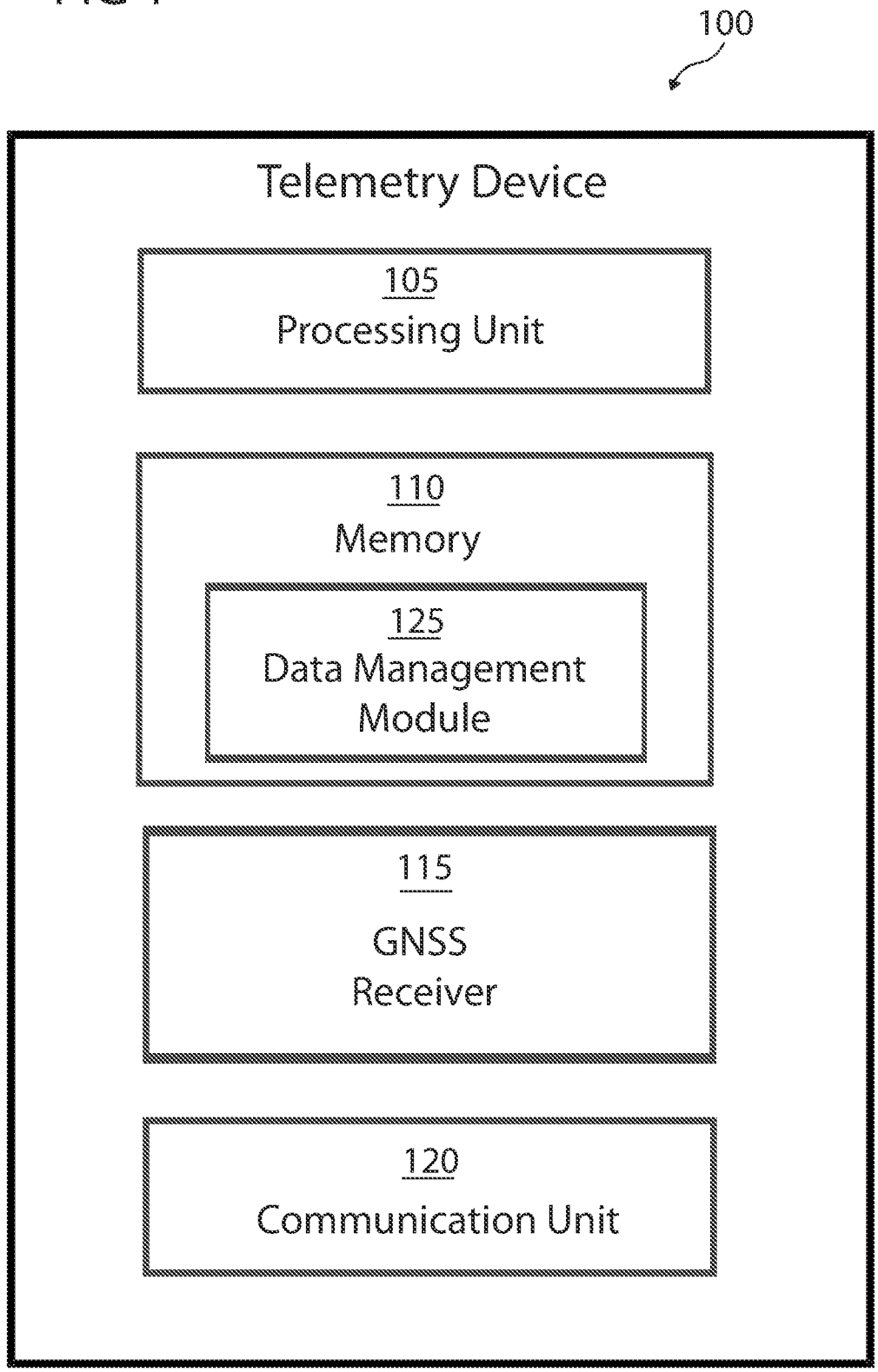
FIG. 1 illustrates a telemetry device configured for mounting on a train, in accordance with an embodiment of the present invention.

Hereinafter, embodiments for carrying out the present invention are described in detail. The various embodiments are described with reference to the drawings, wherein like reference numerals are used to refer to like elements throughout. In the following description, for purpose of explanation, numerous specific details are set forth in order to provide a thorough understanding of one or more embodiments. It may be evident that such embodiments may be practiced without these specific details.

FIG. 1 illustrates a telemetry device 100 configured for mounting on a train, in accordance with an embodiment of the present invention. The telemetry device 100 comprises a processing unit 105, a memory 110, a Global Navigation Satellite System (GNSS) receiver 115 and a communication unit 120. The processing unit 105 includes any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor or any other type of processing circuit. The processing unit 105 may also include embedded controllers, such as generic or programmable logic devices or arrays, application specific integrated circuits, single-chip computers, and the like. In general, the processing unit 105 may comprise hardware elements and software elements. The processing unit 105 can be configured for multithreading, i.e., the processing unit 105 may host different calculation processes at the same time, executing the either in parallel or switching between active and passive calculation processes.

The memory 110 may include one or more of a volatile memory and a nonvolatile memory. The memory 110 may be coupled for communication with the processing unit 105. The processing unit 105 may execute instructions and/or code stored in the memory 110. A variety of computer-readable storage media may be stored in and accessed from the memory 110. The memory 110 may include any suitable element for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, and the like.

The memory 110 comprises a data management module 125 that is stored in the form of machine-readable instructions for execution by the processing unit 105. The memory 110 also stores a unique identifier associated with the telemetry device 100. These machine-readable instructions when executed causes the processing unit 105 to communicate with other adjacent telemetry devices and enables management of data transmission from a plurality of adjacent telemetry devices similar to the telemetry device 100.

The GNSS receiver 115 enables the telemetry device 100 to receive GNSS data from a plurality of GNSS satellites. Based on the GNSS data, the processing unit 105 determines a geospatial location of the telemetry device 100. The term 'geospatial location' as used herein, refers to a geographical coordinate computed based on data received from GNSS satellites. Non-limiting examples of GNSS include, Global Positioning System (GPS), Galileo, GLONASS and BeiDou.

In a preferred embodiment, the communication unit 120 is a software-defined radio system. The communication frequency used by software-defined radio systems vary from 9 kHz to 300 GHz. This enables the software-defined radio system to switch from one communication frequency to another during operation. The term 'communication frequency' as used herein may refer to a frequency within the radio spectrum that enables communication over radio waves between two entities. The communication unit 120 enables the telemetry device 100 to communicate over a first communication frequency, with one or more apparatuses such as a central server, wayside units, or other telemetry systems on the same train or an adjacent train. For example, the telemetry device 100 may update a central server (not shown) with status data, position data etc.

In case the telemetry device 100 is the Head-of-Train device, the communication unit 120 enables communication with the respective End-of-Train device. The communication unit 120 also enables the telemetry device 100 to communicate with one or more other telemetry devices, over the second communication frequency.

The one or more other telemetry devices may be located on the same train or on one or more adjacent trains. The communication between the telemetry devices may be based on standard protocols or proprietary protocols. The frequency used by the communication unit 120 for such communications are defined by regulatory authorities in the territory where the train operates. For example, in North America, End-of-Train devices operate on the frequency 457.9375 MHz while Head-of-Train devices operate at 452.9375 MHz. In Australia, End-of-Train devices operate on the frequency 477.7 MHz and Head-of-Train devices operate at 472.5 MHz.

Figure 2:
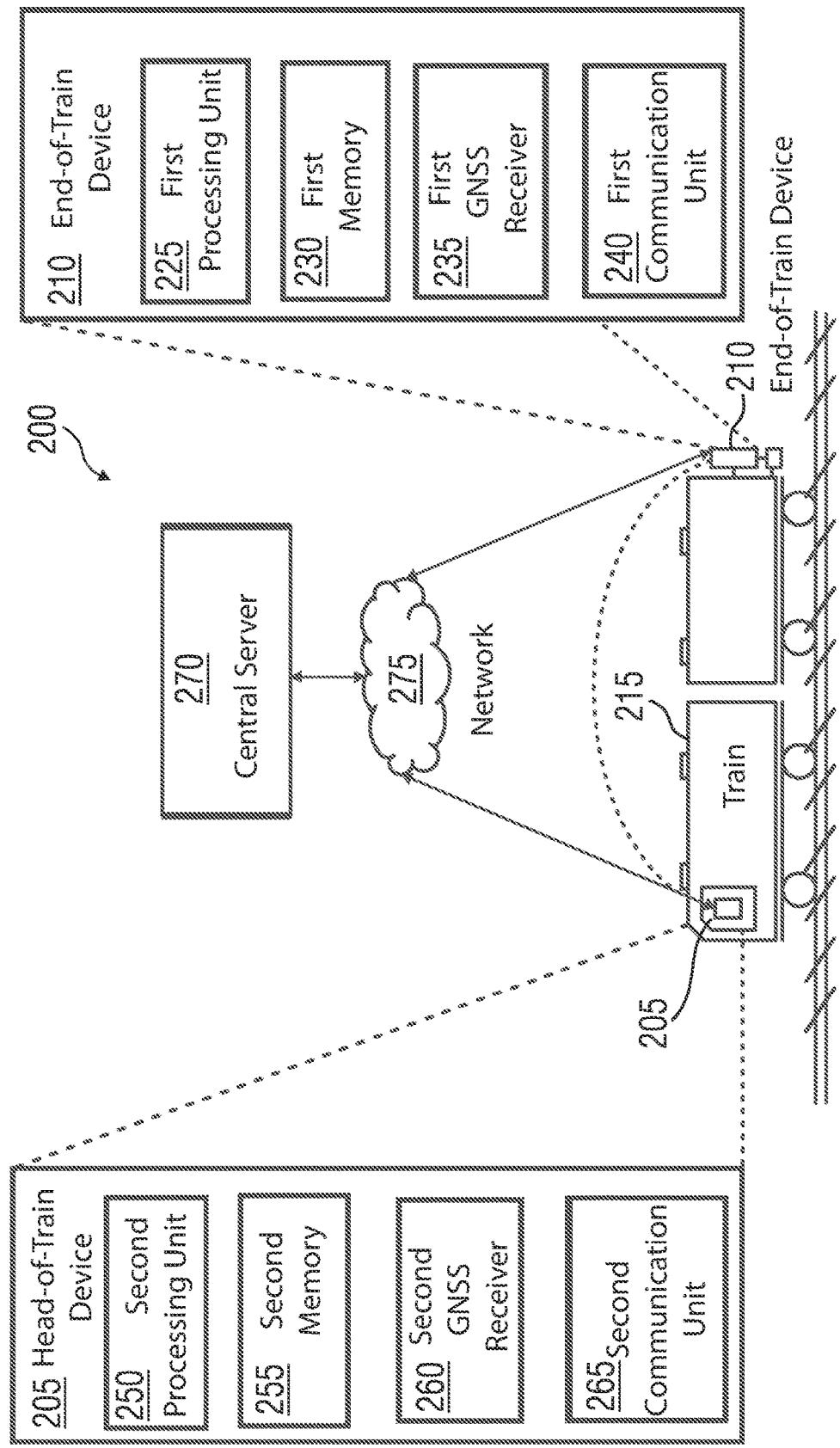
FIG. 2 illustrates an End-of-Train telemetry system comprising a Head-of-Train device and an End-of-Train device associated with a train, in accordance with an embodiment of the present invention.

FIG. 2 illustrates an End-of-Train telemetry system 200 comprising a Head-of-Train device 205 and an End-of-Train device 210 associated with a train 215, in accordance with an embodiment of the present disclosure. Both the Head-of-Train device 205 and the End-of-Train device 210 are telemetry devices communicatively coupled over a telemetry link based on a radio-frequency communication protocol. The End-of-Train device 210 comprises a first processing unit 225, a first memory 230, a first Global Navigation Satellite System (GNSS) receiver 235 and a first communication unit 240. The Head-of-Train device 205 comprises a second processing unit 250, a second memory 255, a second GNSS receiver 260 and a second communication unit 265. Both the Head-of-Train device and the End-of-Train device are configured to periodically transmit statuses along with respective device attributes to a central server 270 over a network 275. The device attributes may include, for example, a device identifier, a device type etc. The central server may further process the statuses to perform one or more functions. The functions may include, for example, trigger an operation on the telemetry devices, providing configuration commands to the telemetry devices, triggering software updates on the telemetry devices etc.

Figure 3B:
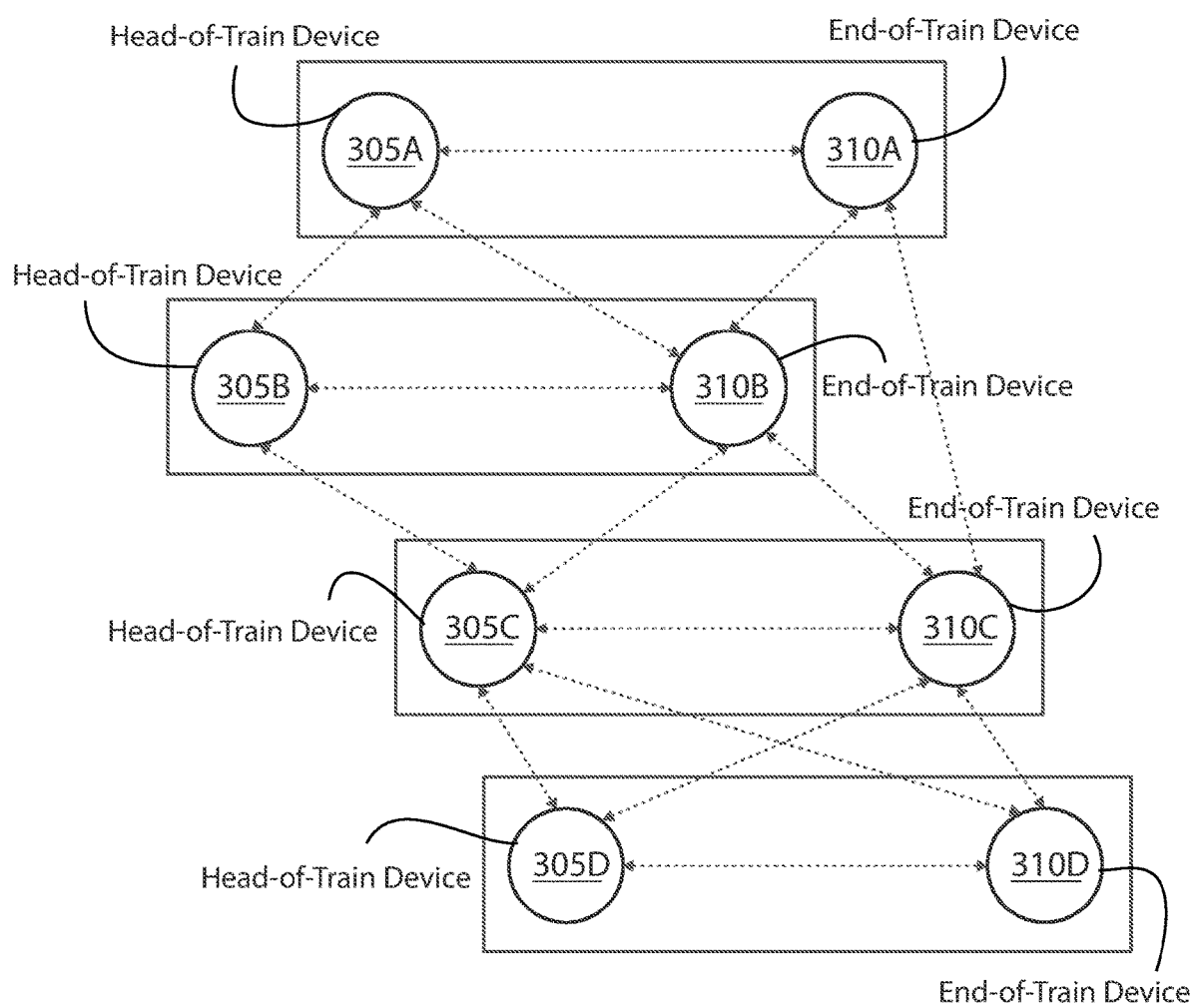
FIG. 3B illustrate an example of reception of signals broadcasted by one telemetry device by one or more other nearby telemetry devices in the vicinity, in accordance with an exemplary embodiment of the present invention.
Figure 3C:
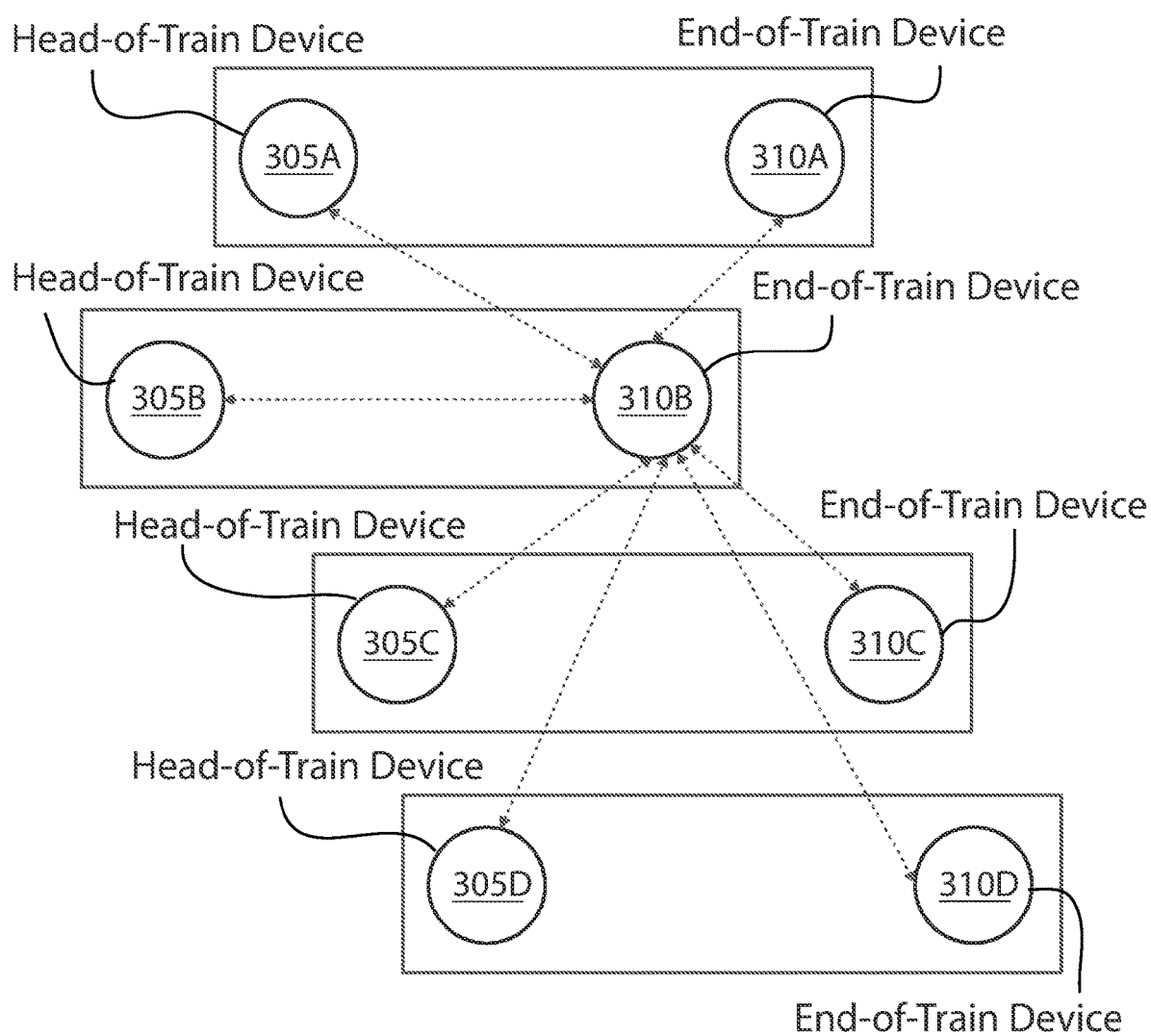
FIG. 3C illustrates management of data transmission from the telemetry devices, in accordance with an exemplary embodiment of the present invention.

FIG. 3A illustrates a network 300 of telemetry devices associated with a plurality of trains 315A-D standing adjacent to each other on parallel tracks in a yard. Each of the trains comprise an EoTT system comprising a Head-of-Train device and an End-of-Train device. For example, train 315A comprises Head-of-Train device 305A and an End-of-Train device 310A, train 315B comprises Head-of-Train device 305B and an End-of-Train device 310B, train 315C comprises Head-of-Train device 305C and an End-of-Train device 310C and train 315D comprises Head-of-Train device 305D and an End-of-Train device 310D. Each of the telemetry devices 310A-D, 315A-D are configured to transmit status data to a central server (not shown) over periodic intervals of time Global System for Mobile Communications (GSM) network. The status data are transmitted in the form of data packets comprising a device attribute associated with the corresponding telemetry device. FIG. 3B illustrate an example of reception of signals broadcasted by one telemetry device by one or more other nearby telemetry devices in the vicinity. FIG. 3C illustrates management of data transmission from the telemetry devices 310A-D, 315A-D, in accordance with an exemplary embodiment of the present invention. The process of managing data transmission from the plurality of telemetry devices are explained in detail with reference to FIG. 4, in conjunction with FIGS. 3A-C.

FIG. 4 shows a flowchart of a method 400 for managing data transmission from a plurality of telemetry devices mounted on one or more trains, in accordance with an embodiment of the present invention. Each of the telemetry devices is configured to periodically transmit status data to one or more apparatuses over a first communication frequency. The plurality of telemetry devices comprises a first telemetry device, and one or more second telemetry devices in a vicinity of the first telemetry device at an instant of time.

In FIG. 3B, for example, if Head-of-Train device 305B acts as the first telemetry device, then Head-of-train devices 305A, 305C and the End-of-Train device 310B act as the second telemetry devices. This is because the Head-of-train devices 305A, 305C and the End-of-Train device 310B are in the vicinity of Head-of-Train device 305B. As used herein, the phrase 'in the vicinity of' is used to refer to a possibility of one telemetry device being able to receive signals directly (as indicated by dotted lines between telemetry devices in FIG. 3B) from another telemetry device. For example, End-of-Train device 310B is said to be in the vicinity of Head-of-Train device 305B, if the Head-of-Train device 305B may sense signals transmitted by the End-of-Train device 310B and vice versa. Here, the term 'first telemetry device' may refer to any one of the telemetry devices, and the term 'second telemetry device' refers to telemetry devices in a vicinity of the first telemetry devices. In other words, the one or more second telemetry devices only include telemetry devices that are detectable by the first telemetry device. It must be understood that different telemetry devices among the plurality of telemetry devices may take the role of the first telemetry devices or second telemetry device at different instances of time. In a preferred embodiment, a certain telemetry device may take over the role of a first telemetry device based on a random timing sequence.

The status data comprises one or more health parameters associated with the telemetry device. Non-limiting examples of health parameters include cell modem health, cell modem signal strength, device health and radio health, received signal strength indicator and transmission power. The cell modem health is a parameter that may indicate whether the telemetry device is able to connect to the network via GPRS. The cell modem signal strength is for example, signal strength of cellular signals as detected by the telemetry device. The device health is a parameter that indicates operational health of the telemetry device. The radio health is a parameter that indicates whether a radio system associated with the telemetry device is working (e.g., whether antenna is connected). It must be understood that health parameters such as received signal strength indicator is computed by the first telemetry device based on signal strength associated with a received signal. Similarly, the transmission power is part of configuration settings associated with a telemetry device.

At step 405, a first telemetry device detects presence of the one or more second telemetry devices. In an embodiment, the presence of the one or more second telemetry devices are detected by, firstly, listening to modulated signals in the first communication frequency. Herein, the term 'listen' refers to the process of picking up or detecting modulated signals in a specific communication frequency. The signals may be further demodulated by the first telemetry device, based on the carrier frequency, to detect a device attribute corresponding to a transmitting telemetry device associated with the signal. The modulated signals may be generated by modulating a carrier signal centered around the first communication frequency, using a modulating signal comprising for example, status data associated with a telemetry device. The modulated signal is generated using modulation techniques, including, but not limited to, amplitude modulation, frequency modulation, phase modulation, pulse-width modulation and phase shift keying. The modulated signal is intended for transmission to the one or more apparatuses by the telemetry device.

In a preferred embodiment, one or more configuration settings of respective communication unit of the first telemetry device are modified based on software-defined radio protocol, in order to pick up or listen to signals in the first communication frequency. Further, each of the modulated signals picked up by the first telemetry device is demodulated based on a predetermined demodulation technique to regenerate the modulating signal. The predetermined demodulation technique is based on standard specifications for modulation and demodulation of signals transmitted from a telemetry device to the one or more apparatuses. The demodulation technique may be based on for example, amplitude modulation, frequency modulation, pulse-width modulation, phase shift keying etc. Further, the modulating signal is processed to identify a device attribute. The device attribute thus identified corresponds to the second telemetry device that transmitted the modulated signal. Similarly, the first telemetry device may detect any number of second telemetry devices by listening to modulated signals in the first communication frequency.

In the present example, the Head-of-Train device 305A may communicate with the central server over a frequency of 452.9375 MHz and may listen for modulated signals having carrier frequency of 452.9375 MHz to detect presence of the one or more second telemetry devices. The Head-of-Train device 305B may detect presence of second telemetry devices 305A, 310B and 305C, as shown in FIG. 3B.

The first telemetry device is further configured to switch to a second communication frequency upon detecting the one or more second telemetry devices. The second communication frequency enables peer-to-peer communication among the telemetry devices. In an example, The software-defined radio protocol may enable the telemetry devices to set to a standard second communication frequency. In an example, the standard second communication frequency may be set at 200 MHz.

In a preferred embodiment, the first telemetry device selects the second communication frequency from among a plurality of second communication frequencies based on data traffic on the network. For example, the second communication frequency may be selected based on other communication frequencies already in use on the network. For example, the telemetry device may communicate with wayside units over a frequency x Hz, with central server over frequency y Hz etc. The second communication frequency may be selected such that there are no overlaps with communication frequencies already in use on the network. In another example, the second communication frequency may be selected based on type or configuration of the telemetry device or the one or more other telemetry devices. For example, the one or more telemetry devices may be of a specific make and may operate over a proprietary protocol that requires a specific second communication frequency.

At step 410, the first telemetry device initiates a negotiation process for identifying a designated telemetry device by broadcasting a negotiation start message over the second communication frequency. The broadcasted negotiation start message is further received by each of the one or more second telemetry devices in the vicinity of the first telemetry device. In particular, the one or more second telemetry devices are intimated of the start of the negotiation process via the negotiation start message, in order to prevent other telemetry devices from initiating the negotiation process in parallel. In response, each of the one or more second telemetry devices transmit respective status data to the first telemetry device over the second communication frequency.

At step 415, the first telemetry device aggregates status data associated with the first telemetry device, and status data received over the second communication frequency from each of the one or more second telemetry devices in response to the negotiation start message. In an embodiment, aggregating the status data includes parsing the status data associated with each of the first telemetry device and the one or more second telemetry devices to determine device attributes and corresponding health parameter values. Further, the health parameter values may be stored against the device attributes in a storage unit associated with the first telemetry device, for example, in the form of a hash table. The hash table may store the device attributes as keys and the health parameter values as values corresponding to the keys. It must be understood that other data structures such as lists, arrays, stacks, queues etc. may also be used in place of hash tables.

At step 420, the first telemetry device processes the aggregated status data to identify a designated telemetry device from among the first telemetry device and the one or more second telemetry devices. In an embodiment, the first telemetry device identifies the designated telemetry device by determining at least one best-suited health parameter value from among the health parameter values associated with the first telemetry device and the one or more second telemetry devices, using a negotiation algorithm. For example, the at least one best-suited health parameter value may include highest value of transmission power from among the transmission power values corresponding to each of the device attributes present in the hash table. In an example, the negotiation algorithm used for identifying the at least one best-suited health parameter may be based on at least one of machine learning algorithms, decision trees, sorting algorithms, or a combination thereof.

Further, a device attribute corresponding to the at least one best-suited health parameter is identified. The identified device attribute is indicative of the designated telemetry device. For example, if the aggregated status data comprises health parameter values corresponding to eight device attributes corresponding to the telemetry devices 305A-D, 310A-D, and if the transmission power is maximum with respect to the telemetry device 310B, then the telemetry device 310B is identified as the designated telemetry device. The designated telemetry device may further establish a communication with each of the first telemetry device and the one or more other second telemetry devices At step 425, the first telemetry device transmits the aggregated status data to the designated telemetry device over the second communication frequency, if the designated telemetry device is not the first telemetry device, to enable the designated telemetry device to perform one or more actions for managing data transmission from the plurality of telemetry devices to the one or more apparatuses. The designated telemetry device may further store the aggregated status in a format similar to that used by the first telemetry device. Non-limiting examples of such formats include hash tables, lists, arrays, stacks, queues etc. The one or more actions may correspond to at least one of optimizing bandwidth usage and minimizing data loss.

In a preferred embodiment, the designated telemetry device may assign configuration data for each of the first telemetry device and the one or more second telemetry devices using a predefined function. In an example, the predefined function may be a random time generator function. Further, the configuration data is transmitted to each of the first telemetry device and the one or more second telemetry devices over the second communication frequency. Here, transmitting the respective configuration data to each of the first telemetry device and the one or more second telemetry devices other than the designated telemetry device enables the respective telemetry devices to configure the respective communication unit for transmitting a status data to one or more apparatuses, over the first communication frequency, based on the configuration data. For example, the apparatus may include a cloud server 270, a wayside system, an onboard subsystem (including other telemetry devices) on the same train or a different train etc.

In a preferred embodiment, the configuration data comprises a backoff time. The backoff time is a waiting period for which the respective telemetry device must remain idle before transmitting respective status data. For example, if backoff time assigned for a telemetry device is 10 seconds, the telemetry device must remain idle for 10 seconds, before a status data may be transmitted to the central server. In another embodiment, the configuration data is a transmission power to be used for transmitting the status data to a specific apparatus, say wayside units. In yet another embodiment, the configuration data is associated with topology policies to be implemented in the network of telemetry devices for enabling exchange of status data amongst the telemetry devices. In yet another embodiment, the configuration data is associated with data traffic diversion policies to be followed by the telemetry devices. In yet another embodiment, the configuration data comprises the first communication frequency to be used by the telemetry devices for transmitting status data to the one or more apparatuses.

In another embodiment, the designated telemetry device transmits the aggregated status data received from the first telemetry device to the central server over the first communication frequency. The central server may further process the aggregated status data to analyze health parameters associated with each of the first telemetry device and the one or more second telemetry devices.

In a further embodiment, the plurality of telemetry device may also comprise one or more third telemetry devices that are undetected by the first telemetry device at step 405 in method 400, but detectable by the designated telemetry device. In the example shown in FIG. 3B, the telemetry devices 305D, 310A, 310C, 310D are undetectable by the telemetry device 305B. Therefore, if the first telemetry device is telemetry device 305B, telemetry devices 305D, 310A, 310C, 310D are the third telemetry devices.

The designated telemetry system may obtain status data associated with the one or more third telemetry devices by broadcasting a status data request over the second communication frequency as shown in the example of FIG. 3C. In an embodiment, the designated telemetry device may distinguish the first telemetry devices and the one or more second telemetry devices, from the one or more third telemetry devices based on device attributes. For example, if the device attributes of specific telemetry devices detected by the designated telemetry device are not present in the aggregated status data, those telemetry devices are identified as third telemetry devices. The designated telemetry device may also transmit the status data request specifically to the identified third telemetry device by establishing a communication link, instead of broadcasting.

Each of the third telemetry devices are configured to respond to the status data request by transmitting respective status data to the designated telemetry device over the second communication frequency. The responsible telemetry device further identifies the third telemetry devices based on device attributes present in the received status data. For example, if the device attribute present in a status data is not present in the aggregated status data received from the first telemetry device, then such a device attribute corresponds to a third telemetry device. Further, the designated telemetry device updates the aggregated status data received from the first telemetry device with the status data obtained from the one or more third telemetry devices. For example, the designated telemetry device may update a hash table corresponding to the aggregated status data, by adding new keys (device attributes) and corresponding health parameter values.

In a preferred further embodiment, the designated telemetry device determines configuration data, for each of the first telemetry device, the one or more second telemetry devices and the one or more third telemetry devices using a predefined function, as explained earlier. Further, the designated telemetry device transmits the respective configuration data to each of the first telemetry device, the one or more second telemetry devices other than the designated telemetry device and the one or more third telemetry devices, over the second communication frequency. Each of the first telemetry device, the one or more second telemetry devices and the one or more third telemetry devices are configured to transmit respective status data to the one or more apparatuses based on the configuration data received from the designated telemetry device, similar to the previous embodiments.

In an alternate embodiment, the designated telemetry device further transmits the updated aggregated status data to the central server over the first communication frequency. The central server may further analyze the health parameters of each of the first telemetry device, the one or more second telemetry devices and the one or more third telemetry devices.

Advantageously, aggregation of the status data from the plurality of telemetry devices, and subsequent transmission of the aggregated status data by a single designated telemetry device to the central server enables optimized bandwidth utilization. Similarly, assignment of backoff times to each of the telemetry devices helps in avoiding data loss or data congestion through compartmentalization of data transmission, i.e., by allowing only one telemetry device to communicate with the central server at a time.

The present invention is not limited to a particular computer system platform, processing unit, operating system, or network. One or more aspects of the present invention may be distributed among one or more computer systems, for example, servers configured to provide one or more services to one or more client computers, or to perform a complete task in a distributed system. For example, one or more aspects of the present invention may be performed on a client-server system that comprises components distributed among one or more server systems that perform multiple functions according to various embodiments. These components comprise, for example, executable, intermediate, or interpreted code, which communicate over a network using a communication protocol. The present invention is not limited to be executable on any particular system or group of system, and is not limited to any particular distributed architecture, network, or communication protocol.

While the invention has been illustrated and described in detail with the help of a preferred embodiment, the invention is not limited to the disclosed examples. Other variations can be deducted by those skilled in the art without leaving the scope of protection of the claimed invention.

I claim:

1. A first telemetry device configured to:
   detect presence of one or more second telemetry devices;
   initiate a negotiation process for identifying a designated telemetry device from among the first telemetry device and the one or more second telemetry devices by broadcasting a negotiation start message over a second communication frequency;
   aggregate status data associated with the first telemetry device, and status data received over the second communication frequency from the one or more second telemetry devices in response to the negotiation start message;
   process the aggregated status data to identify the designated telemetry device from among the first telemetry device and the one or more second telemetry devices; and
   transmit the aggregated status data to the designated telemetry device over the second communication frequency, if the designated telemetry device is not the first telemetry device, to enable the designated telemetry device to perform one or more actions for managing data transmission from the first telemetry device and the one or more second telemetry devices.

2. A system comprising a plurality of telemetry devices mounted on one or more trains, wherein each of the telemetry devices is configured to periodically transmit status data to one or more apparatuses over a network over a first communication frequency, and wherein the plurality of telemetry devices comprises a first telemetry device and one or more second telemetry devices in a vicinity of the first telemetry device at an instant of time, wherein the first telemetry device is configured to:
 detect presence of the one or more second telemetry devices;
 initiate a negotiation process for identifying a designated telemetry device from among the first telemetry device and the one or more second telemetry devices by broadcasting a negotiation start message over a second communication frequency;
 aggregate status data associated with the first telemetry device, and status data received over the second communication frequency from the one or more second telemetry devices in response to the negotiation start message;
 process the aggregated status data to identify the designated telemetry device from among the first telemetry device and the one or more second telemetry devices; and
 transmit the aggregated status data to the designated telemetry device over the second communication frequency, if the designated telemetry device is not the first telemetry device, to enable the designated telemetry device to perform one or more actions for managing data transmission from the plurality of telemetry devices.

3. The system of claim 2, wherein the status data of each of the plurality of telemetry devices comprises one or more health parameters associated with the respective telemetry device.

4. The system of claim 2, wherein the first telemetry device is configured to detect presence of the one or more second telemetry devices by:
 listening to modulated signals transmitted by a second telemetry device of the one or more second telemetry devices in the first communication frequency;
 demodulating each of the modulated signals based on a predetermined demodulation technique to generate a modulating signal; and
 processing the modulating signal to identify a device attribute, wherein the device attribute corresponds to the second telemetry device that transmitted the modulated signals.

5. The system of claim 2, wherein the first telemetry device is configured to process the aggregated status data to identify the designated telemetry device from among the first telemetry device and the one or more second telemetry devices, by:
 determining at least one best-suited health parameter from among health parameters associated with the first telemetry device and the one or more second telemetry devices, using a negotiation algorithm; and
 identifying a device attribute corresponding to the at least one best-suited health parameter, wherein the identified device attribute is indicative of the designated telemetry device.

6. The system of claim 2, wherein the designated telemetry device is configured to:
 transmit the aggregated status data transmitted from the first telemetry device to the one or more apparatuses over the first communication frequency.

7. The system of claim 2, wherein the designated telemetry device is configured to:
 determine configuration data for each of the first telemetry device and the one or more second telemetry devices, using a predefined function; and
 transmit the respective configuration data to each of the first telemetry device and the one or more second telemetry devices other than the designated telemetry device, over the second communication frequency, wherein each of the first telemetry device and the one or more second telemetry devices are configured to receive the respective configuration data from the designated telemetry device and configured, based on the configuration data received from the designated telemetry device, to transmit respective status data to the one or more apparatuses.

8. The system of claim 2, wherein the designated telemetry device is configured to:
 obtain status data from one or more third telemetry devices undetected by the first telemetry device over the second communication frequency; and
 update the aggregated status data transmitted from the first telemetry device with the status data obtained from the one or more third telemetry devices.

9. The system of claim 8, wherein the designated telemetry device is further configured to:
 transmit the updated aggregated status data to the one or more apparatuses over the first communication frequency.

10. The system of claim 8, wherein the designated telemetry device is configured to:
 determine configuration data for each of the first telemetry device, the one or more second telemetry devices and the one or more third telemetry devices using a predefined function; and
 transmit the respective configuration data to each of the first telemetry device, the one or more second telemetry devices and the one or more third telemetry devices other than the designated telemetry device, over the second communication frequency, wherein each of the first telemetry device, the one or more second telemetry devices and the one or more third telemetry devices is configured to receive the respective configuration data from the designated telemetry device, and configured, based on the configuration data received from the designated telemetry device, to transmit respective status data to the one or more apparatuses.

11. A method for managing data transmission from a plurality of telemetry devices mounted on one or more trains, wherein each of the telemetry devices is configured to periodically transmit status data to one or more apparatuses over a first communication frequency, and wherein the plurality of telemetry devices comprises a first telemetry device, and one or more second telemetry devices in a vicinity of the first telemetry device at an instant of time, the method comprising:
 detecting, by the first telemetry device, presence of the one or more second telemetry devices;
 initiating, by the first telemetry device, a negotiation process for identifying a designated telemetry device from among the first telemetry device and the one or more second telemetry devices by broadcasting a negotiation start message over a second communication frequency;

aggregating, by the first telemetry device, status data associated with the first telemetry device, and status data received over the second communication frequency from the one or more second telemetry devices in response to the negotiation start message;

processing, by the first telemetry device, the aggregated status data to identify the designated telemetry device from among the first telemetry device and the one or more second telemetry devices; and transmitting, by the first telemetry device, the aggregated status data to the designated telemetry device over the second communication frequency, if the designated telemetry device is not the first telemetry device, to enable the designated telemetry device to perform one or more actions for managing data transmission from the plurality of telemetry devices.

12. The method of claim 11, wherein the status data of each of the plurality of telemetry devices comprises one or more health parameters associated with the respective telemetry device.

13. The method of claim 12, wherein the one or more health parameters comprise at least one of cell modem health, cell modem signal strength, device health and radio health, received signal strength and transmission power.

14. The method of claim 11, wherein detecting, by the first telemetry device, presence of the one or more second telemetry devices comprises:

listening, by the first telemetry device, to modulated signals transmitted by a second telemetry device of the one or more second telemetry devices in the first communication frequency;

demodulating, by the first telemetry device, each of the modulated signals based on a predetermined demodulation technique to generate a modulating signal; and processing, by the first telemetry device, the modulating signal to identify a device attribute, wherein the device attribute corresponds to the second telemetry device that transmitted the modulated signals.

15. The method of claim 11, wherein processing, by the first telemetry device, the aggregated status data to identify the designated telemetry device from among the first telemetry device and the one or more second telemetry devices, comprises:

determining, by the first telemetry device, at least one best-suited health parameter from among health parameters associated with the first telemetry device and the one or more second telemetry devices, using a negotiation algorithm; and identifying, by the first telemetry device, a device attribute corresponding to the at least one best-suited health parameter, wherein the identified device attribute is indicative of the designated telemetry device.

16. The method of claim 11, further comprising:
transmitting, by the designated telemetry device, the aggregated status data transmitted from the first telemetry device to the one or more apparatuses over the first communication frequency.

17. The method of claim 11, further comprising:
computing, by the designated telemetry device, at least one configuration data to be assigned to each of the first telemetry device and the one or more second telemetry devices using a predefined function; and transmitting, by the designated telemetry device, the respective configuration data to each of the first telemetry device and the one or more second telemetry devices other than the designated telemetry device, over the second communication frequency, wherein each of the first telemetry device and the one or more second telemetry devices is configured to receive the respective configuration data from the designated telemetry device, and configured, based on the configuration data received from the designated telemetry device, to transmit respective status data to the one or more apparatuses.

18. The method of claim 11, further comprising:
obtaining, by the designated telemetry device, status data from one or more third telemetry devices undetected by the first telemetry device over the second communication frequency; and updating, by the designated telemetry device, the aggregated status data transmitted from the first telemetry device with the status data obtained from the one or more third telemetry devices.

19. The method of claim 18, further comprising:
transmitting, by the designated telemetry device, the updated aggregated status data to the one or more apparatuses over the first communication frequency.

20. The method of claim 18, further comprising:
determining, by the designated telemetry device, configuration data for each of the first telemetry device, the one or more second telemetry devices and the one or more third telemetry devices using a predefined function; and transmitting, by the designated telemetry device, the respective configuration data to each of the first telemetry device, the one or more second telemetry devices other than the designated telemetry device and the one or more third telemetry devices, over the second communication frequency, wherein each of the first telemetry device, the one or more second telemetry devices and the one or more third telemetry devices is configured to receive the respective configuration data from the designated telemetry device, and configured, based on the configuration data received from the designated telemetry device, to transmit respective status data to one or more apparatuses.

* * * * *